United States Patent
Ramanujam et al.

(10) Patent No.: US 7,315,501 B1
(45) Date of Patent: Jan. 1, 2008

(54) SYSTEM AND METHOD FOR RECORDING OF INFORMATION ON A HOLOGRAPHIC RECORDING MEDIUM, PREFERABLY AN OPTICAL CARD

(75) Inventors: P. S. Ramanujam, Roskilde (DK); Sören Hvilsted, Horsholm (DK); Pál Koppa, Budapest (HU); Emöke Lörincz, Budapest (HU); Péter Richter, Budapest (HU); Gábor Szarvas, Budapest (HU)

(73) Assignee: Riso National Laboratory (DK)

( * ) Notice: Subject to any disclaimer, the term of this patent is extended or adjusted under 35 U.S.C. 154(b) by 0 days.

(21) Appl. No.: 09/674,402

(22) PCT Filed: May 4, 1999

(86) PCT No.: PCT/HU99/00035

§ 371 (c)(1),
(2), (4) Date: Jan. 2, 2001

(87) PCT Pub. No.: WO99/57719

PCT Pub. Date: Nov. 11, 1999

(30) Foreign Application Priority Data

May 5, 1998 (HU) .................................. 9801029

(51) Int. Cl.
*G11B 7/00* (2006.01)
*G11B 7/12* (2006.01)
*G11B 7/24* (2006.01)

(52) U.S. Cl. ............... 369/103; 369/112.1; 369/112.15

(58) Field of Classification Search ............... 369/103, 369/109.02, 44.11, 44.19, 275.1, 110.01, 369/112.02, 112.16, 112.17, 112.23, 44.16, 369/44.23, 112.15, 112.1; 359/22, 3, 24, 359/11, 15, 10, 618, 640, 29, 566, 710, 719, 359/565, 569, 708, 742, 7; 380/54
See application file for complete search history.

(56) References Cited

U.S. PATENT DOCUMENTS 4,888,260 A 12/1989 Cowan .................... 430/1

(Continued)

FOREIGN PATENT DOCUMENTS

DE 19534501 5/1996

(Continued)

OTHER PUBLICATIONS

Ramanujam P.S. et al., "Side-chain liquid-crystalline polyesters for optical information storage", Polymers For Advanced Technologies, GB, John Wiley and Sons, Chichester, vol. 7, No. 9, Sep. 1, 1996, pp. 768-776.

(Continued)

*Primary Examiner*—Andrea Wellington
*Assistant Examiner*—Kim-Kwok Chu
(74) *Attorney, Agent, or Firm*—McDonnel Boehnen Hulbert & Berghoff LLP

(57) ABSTRACT

The invention relates to a method for the recording and reading of data with a holographic write/read apparatus onto a holographic recording medium with a thin holographic recording layer. The medium is preferably an optical card (2). The recording of the information is in the form of data pages stored as thin Fourier holograms (61). According to the invention, it is foreseen to use reflected transmission and polarisation holography with different write and read wavelengths, and to correct during reading the distortion in the readout channel caused by the difference between the write and read wavelengths. The invention further relates to an apparatus and system for performing the method. There is also disclosed a method of coding the recorded information.

2 Claims, 7 Drawing Sheets

U.S. PATENT DOCUMENTS

| | | | | |
|---|---|---|---|---|
| 4,909,616 A | * | 3/1990 | Arai | 359/708 |
| 4,993,789 A | * | 2/1991 | Biles et al. | 359/15 |
| 5,257,133 A | * | 10/1993 | Chen | 359/565 |
| 5,319,629 A | * | 6/1994 | Henshaw et al. | 369/103 |
| 5,543,966 A | * | 8/1996 | Meyers | 359/565 |
| 5,566,387 A | | 10/1996 | Dewald | 369/103 |
| 5,625,619 A | * | 4/1997 | Toda et al. | 369/109.02 |
| 5,633,100 A | | 5/1997 | Michish et al. | 430/1 |
| 5,671,073 A | | 9/1997 | Psaltis et al. | 359/22 |
| 5,684,641 A | * | 11/1997 | Tanaka et al. | 359/719 |
| 5,710,645 A | | 1/1998 | Phillips et al. | 359/1 |
| 5,715,316 A | * | 2/1998 | Steenblik et al. | 380/54 |
| 5,789,733 A | | 8/1998 | Jachimowicz et al. | 235/492 |
| 5,949,558 A | * | 9/1999 | Psaltis et al. | 359/22 |
| 5,982,513 A | * | 11/1999 | Zhou et al. | 359/22 |

FOREIGN PATENT DOCUMENTS

| | | | |
|---|---|---|---|
| JP | 07065138 | | 3/1995 |
| WO | WO97/02563 | | 1/1997 |
| WO | WO 97/02563 | * | 1/1997 |
| WO | WO98/02849 | | 1/1998 |
| WO | WO99/57719 | | 11/1999 |

OTHER PUBLICATIONS

"*Free-Space Optical Interconnections With Liquid-Crystal Microprism Arrays*", in Applied Optics, May 10, 1995, vol. 34, No. 14, pp. 2571-2580.

Hvilsted et al., "*Side-chain liquid-crystalline polyesters for optical information storage*", Optics Letters, vol. 17, No. 17, Sep. 1, 1992, pp. 1234-1236, NY.

Eichler et al., "*High Density Disc Storage by Multiplexed Microholograms*", SPIE vol. 3109, 1997, pp. 239-244.

Ramanujam et al., "*Side-Chain Liquid Crystalline Polyesters For Optical Information Storage*", Polymers For Advanced Technologies, vol. 7, Feb. 29, 1996, pp. 768-776.

Todorov et al., "*Polarization Holography. I: A New High-Efficiency Organic Material With Reversible Photoinduced Birefringence*", Applied Optics, vol. 23 No. 23, Dec. 1, 1984, pp. 4309-4312.

Todorov et al., "*Polarization Holography. 2: Polarization Holographic Gratings In Photoanisotropic Materials With And Without Intrinsic Birefringence*", Applied Optics, vol. 23 No. 24, Dec. 15, 1984, pp. 4588-4591.

Denz et al., "*Volume Hologram Multiplexing Using A Deterministic Phase Encoding Method*", Optics Communications vol. 85, No. 2,3, Sep. 1, 1991, pp. 171-176.

* cited by examiner

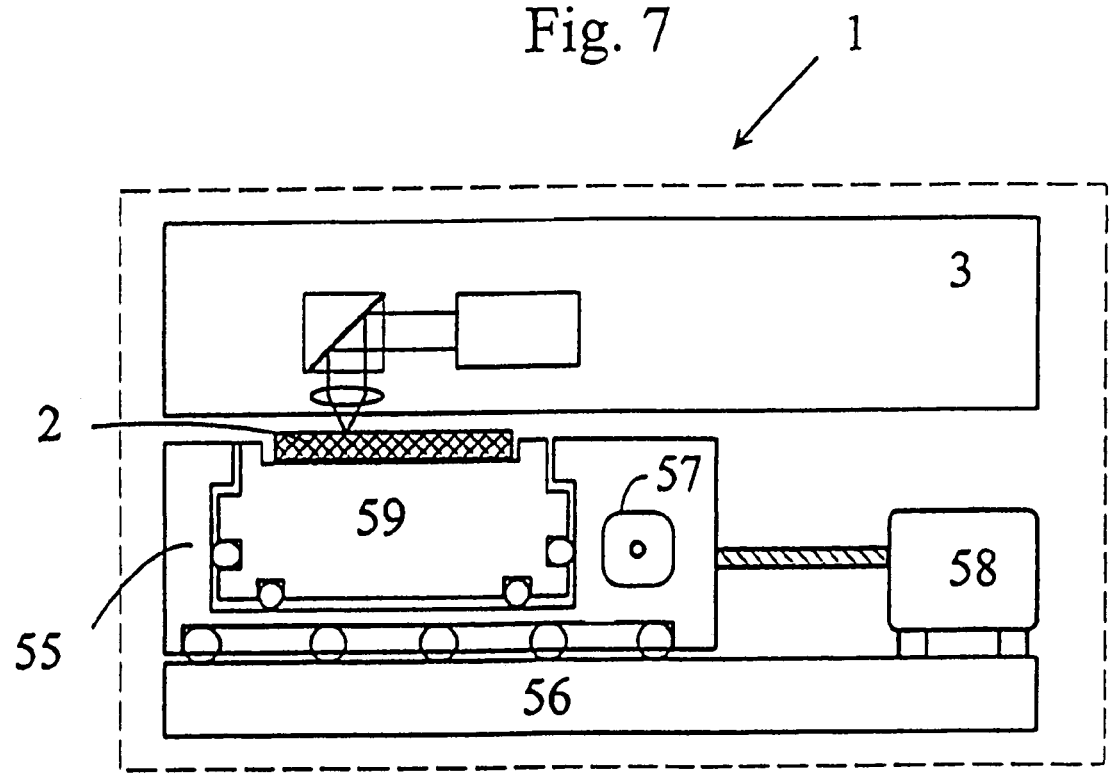

SYSTEM AND METHOD FOR RECORDING OF INFORMATION ON A HOLOGRAPHIC RECORDING MEDIUM, PREFERABLY AN OPTICAL CARD

TECHNICAL FIELD

The present invention concerns a method and apparatus for the recording and reading of data on a recording medium, preferably an optical card, by holography. The invention also relates to an apparatus for use with the method of the invention. The apparatus uses a holographic recording medium, and holographic write/read optical system. The recording medium is preferably an optical card. It has a thin holographic recording layer, wherein the recording of the information is in the form of data pages stored as thin Fourier holograms. The invention further relates to a method of coding of the recorded information on a holographic optical recording medium. In the method, the information is recorded in the form of several discrete holograms recorded in different physical and/or logical recording locations on the optical recording medium, Each holograms containing data sets and the sequence of the data sets together constitute the recorded information.

BACKGROUND ART

The known optical memory cards provided approx. 4-6 MB of data on a credit card sized optical card, and the reader/write units offer 30-10 KB/s data transfer rate. Writing speeds are normally slower than reading speeds.

Holographic recording is known for its inherent high data density, and therefore has been suggested for use in a data storage card. A number of solutions have been proposed for incorporating holograms into data storage cards, but the holograms is mostly used for authentication purposes, and not for data storage. Using holograms to store data on a credit-card sized data card involves several problems. First, most holographic techniques require that the photosensitive medium storing the hologram be illuminated from both sides, either during recording or during readout. Accordingly, the recording medium, preferably an optical card holding the holograms should have an optical-quality surface on both sides, and have constant thickness. These requirements are difficult to meet with a conventional plastic card. Second, for data storage application it is desirable to use a recording medium that may be erased and re-recorded. There are very few erasable optical materials that are suitable for holographic recording, the achievable signal-to-noise ratio is relatively low and high exposition energy is needed. Third, with every readout, the recorded holograms will be slightly erased. To ensure the stability of the recorded holograms, different reading and writing wavelength is required, but in this case the reconstructed image of the hologram is distorted so much, that high-density storage is not possible.

A known method of reflection holography is disclosed in the publication DE 195 34 501 A1., and in the publication "High density disc storage by multiplexed microholograms", SPIE Vol. 3109, pp. 239-244. In these solutions a method is suggested to create reflection holograms. It is suggested to apply a mirror under the recording layer during the recording phase, so that the object beam reflected from the mirror will act as reference beam. Thereby no separate optical path is needed for the reference beam. It is suggested to multiply the storage capacity by different forms of multiplexing. The holograms are reconstructed as volume reflection holograms. A disadvantage of the proposed solution is that the mirror must be removed during readout, which makes this system unfit for practical optical recording systems. Also, there is no suggestion to use this method with an optical card.

Another form for reflection holography is disclosed in the U.S. Pat. No. 5,633,100, which patent teaches a process for forming a volume reflection holograms. This known solution also require the use of a reference beam that is incident on the opposite surface of the photosensitive medium, so the solution is not practical for an optical card. U.S. Pat. No. 4,888,260 discloses another method for the preparation of a volume phase reflection hologram. Here, the volume phase reflection hologram is formed by a second off-axis hologram in the same recording medium. This method is not suitable for forming erasable and re-recordable holograms, and the optical system is very complicated. U.S. Pat. No. 5,710,645 discloses a method and system for recording a grazing incidence hologram, which is supported on a substrate having a thin edge-illuminatable geometry, like an optical card. Theoretically, this system could be used for data storage as well, but again the edge-illumination demands very special mechanical and optical properties of the card carrying the hologram.

The document "Side-chain liquid crystalline polyesters for optical information storage", published in OPTICS LETTERS, vol. 17. no. 17. September 1992, pages 1234-1236, New York, US mentions the possibility of polarisation holographic recording in combination with different write and read laser wavelength. However, this document does not address the problem of distortion caused by the difference in the wavelengths.

The document WO-A-97/02563 discloses an optical system for holographic recording. This known system also includes lasers with a different read and write wavelength. The suggested data storage medium is a card with a thick (50 μm) holographic storage layer. Different forms of holography are suggested, but polarisation holography is not mentioned. The write and read optics contain waveguide structures in combination with detector cells to read out the data, instead of traditional optical systems. The optical head detects the intensity modulation caused by the recorded holograms directly, and there is no imaging system between the storage medium and the optical head. Therefore, the problem of wavelength distortion is not addressed either. On the other hand, the disclosed complex waveguide head comprises expensive acousto-optical elements and other electro-optical devices which require very sophisticated control and power supply systems. This optical head can not be manufactured in a cost-effective way with current technology.

Therefore, it is the object of the invention to provide a method and system for data storage based on reflection holography, where the holograms may be recorded and erased several times, preferably in an unlimited number of cycles, and where the holograms need to be accessed from one side only, both during writing and readout. Also, the holograms should be stored on an optical recording medium, preferably an optical card or disk that is easily to manufacture, and which tolerates normal daily wear, i.e. which is subjected to the same or similar treatment as a traditional plastic credit card or a floppy disk. It is a further object of the invention to provide a method and system for data storage where the read-write apparatus contains a relatively small, simple and cheap optical system. It is a further object to provide an optical recording method that ensures high data density and high data transfer rate, and at the same time allow efficient encoding or encryption of the data, and thereby provides enhanced security.

SUMMARY OF THE INVENTION

According to the invention, this goal is achieved by a method, which uses a holographic write/read apparatus, and a recording medium, preferably an optical card, with a thin holographic recording layer. The holographic recording medium may be in the form of an optical disk or tape as well. The term "thin" means that the layer thickness is in the order of the light wavelength, and the holograms recorded may not be regarded as traditional volume holograms, so that the recording of the information is in the form of data pages stored as thin Fourier holograms.

According to the invention, reflected transmission and polarisation holography with different write and read wavelengths are used and further, the distortion is corrected during reading, which distortion is caused by the difference between the write and read wavelengths.

The use of reflected transmission holography is a key element in the recording method of the invention. It has been proposed to overcome the problems involved with the illumination of or accessing of the hologram from two sides, either during recording or readout. Therefore, it is suggested to use a form of reflection holography, which will be referred to hereinafter as reflected transmission holography. In accordance with the invention, in this holographic recording method the recording layer is relatively thin, and there is a reflective layer under the recording layer. The readout of the hologram is performed in the transmission mode, but the transmitted object wave is reflected from the reflective layer, propagates through the recording medium, and is detected on the same side from which the reference wave arrives.

According to the invention, for the method it is suggested to use a holographic recording medium, such as a memory card having a carrier substrate, a holographic recording layer sensitive to light, and a reflection layer between the carrier substrate and the recording layer. In the recording medium of the invention the recording layer is a polarisation sensitive polymer material, and the thickness of the recording layer is 0.5-2 times the wavelength of the reading and/or recording light.

The method is realised with an apparatus for the writing and reading of a holographic recording medium, preferably an optical card, having a recording medium holding and/or positioning mechanism, movable or fixed read and write optics, where the write optics comprising a polarised writing light source, a polarising selector means for separating and/or combining the reference beam and the object beam, object beam modulating means, a polarisation wave plate, an objective lens for imaging the object beam onto a recording layer, and further the read optics comprising a polarised reading light source, and a polarising means and/or spatial filtering means for separating and/or combining the reference beam and the image beam, a light detector and an objective lens for imaging the image beam onto a light detector. In the apparatus according to the invention, the wavelength of the reading light source is different from the writing light source, and the read optics comprise wavelength distortion correcting means for correcting the distortion of the reconstructed image caused by the difference in the wavelength of the reading and writing light.

The invention also includes a holographic data storage system with a holographic recording medium, and a read/write apparatus for the holographic recording medium, particularly with the recording medium and for the read/write apparatus according to the invention. The proposed system utilises reflected transmission and polarisation holograms with different read and write wavelengths, together with distortion correction means for correcting the distortion caused by the difference between the read and write wavelengths.

According to the invention, there is also provided a method wherein the wavelength distortion is corrected by optical and/or software means. In the most preferred embodiment the correction is performed by an appropriately designed lens system and the holograms are recorded as on-axis holograms, using the advantages of the polarisation recording.

It is suggested that the recording and reading is made with polarisation multiplexing and/or phase-code and/or rotational multiplexing. Especially the so-called deterministic phase-code multiplexing is foreseen, which may increase capacity by an order of magnitude, and also contributes to the encryption of the data, as will be shown below.

In a special embodiment of the holographic recording medium of the invention the reflection layer is a wavelength selective mirror reflecting on the read wavelength and transmitting or absorbing on the write wavelength. This arrangement greatly improves the sensitivity of the recording.

In a further embodiment, the holographic medium is a write-once or erasable-rewritable holographic medium, preferably a side-chain polyester (SCP), most preferably azobenzene SCP. Azobenzene SCP is a novel holographic material, allowing the recording of high-density data storage using polarisation holography.

Advantageously, the wavelength of the writing length source of the apparatus of the invention is between 400-550 nm, and the wavelength of the reading light source is between 600-700 n. Such light source are readily available in the forms of laser diodes, allowing the construction of small and robust optical read/write systems. Other light sources, such as solid state lasers are also considered, because they provide higher energy levels.

In the most preferred embodiment, the wavelength distortion correcting means of the read optics comprises an aspherical plastic objective lens.

It is contemplated that the object beam and the reference beam in the read optics and/or the write optics have a common optical axis, and there is provided a polarisation selective beam splitter in combination with a polarisation wave plate and/or a beam stop for separating the reflected reference beam from the reflected object beam. This is feasible, because the polarisation holography technique suggested allows the separation of the reference beam from the object beam, and the SNR of the readout is high.

Advantageously, polarisation encoder means, especially liquid crystal spatial light modulators (LCSLMs) are provided in the optical path of the reference beam. These devices allow the use of phase code multiplexing.

It has been found practical and feasible for the read optics and the write optics to have a common objective lens for imaging the reference and object beams onto a recording layer and for imaging the reflected object beams onto the read detector. Thereby the optical system may be compact and lightweight, and the positioning system is simpler. Also, direct readout after recording is possible, practically without any delay.

In an especially preferred embodiment of the apparatus, the common objective lens is an aspheric lens for the correction of the wavelength distortion, where a central region of the aspheric lens is tuned to the wavelength of the writing light source for focussing the write object beam onto the recording layer and at the same time tuned to the wavelength of the read light source for imaging the read object beam onto the detector, and further the annular region of the lens is tuned to the wavelength of the read light source for imaging the reflected beam onto the detector.

In a further preferred embodiment of the optical system of the invention, the holographic record and readout optics comprise means for reading and/or writing multiplexed holograms. For example, using deterministic phase encoding multiplexing, the information density of a hologram may be increased in theory by several magnitudes. In a practically viable system, multiplexing with a factor of five to thirty is possible.

Using the advantageous properties of the holographic recording method and the recording medium of the invention, it is also proposed to implement a novel method for the coding of the recorded information on the holographic optical recording medium. The method comprises the recording of the information in the form of several discrete holograms and/or subholograms recorded in different physical and/or logical recording locations on the optical recording medium, preferably an optical card. These holograms or subholograms contain data sets, where the sequence of the data sets together constitute the recorded information. According to the inventive method, the data sets are recorded in a random sequence of the recording locations. If the sequence of the recording is not readily known, the access to the data is effectively blocked. The method requires relatively little excess memory capacity, but at the same time it is very effective.

It is also contemplated that the information is recorded in multiplexed holograms, and the logical recording locations are identified by the multiplexing address. In the most preferred embodiment, the information is recorded by polarisation holography using phase-code multiplexing, where one physical hologram volume contains several phase-coded multiplexed subholograms. The logical recording locations are identified by the phase code address.

In a further improved implementation, the location of the first data set is stored, and the location of the following data sets are stored in the previous data sets. It is especially foreseen that the physical recordings follow each other in an ordered sequence, but that the phase code addresses change randomly. Thereby the readout data rate can be maintained at a high level, but the encoding is still ensured. In an optional preferred realisation of the method, the random sequence of the data sets is stored and encrypted and/or made inaccessible for unauthorised users. This latter solution may facilitate the faster readout of the data.

BRIEF DESCRIPTION OF DRAWINGS

The invention will now be described in more detail herein below with reference to the accompanying drawings, which, by way of example only, illustrate preferred embodiments of the methods, apparatus and the system according to the invention, together with the optical recording medium.

In the drawings

FIG. 7 shows a schematic diagram of the mechanical positioning system of the apparatus according to the invention.

BEST MODE FOR CARRYING OUT THE INVENTION

Figure 1:
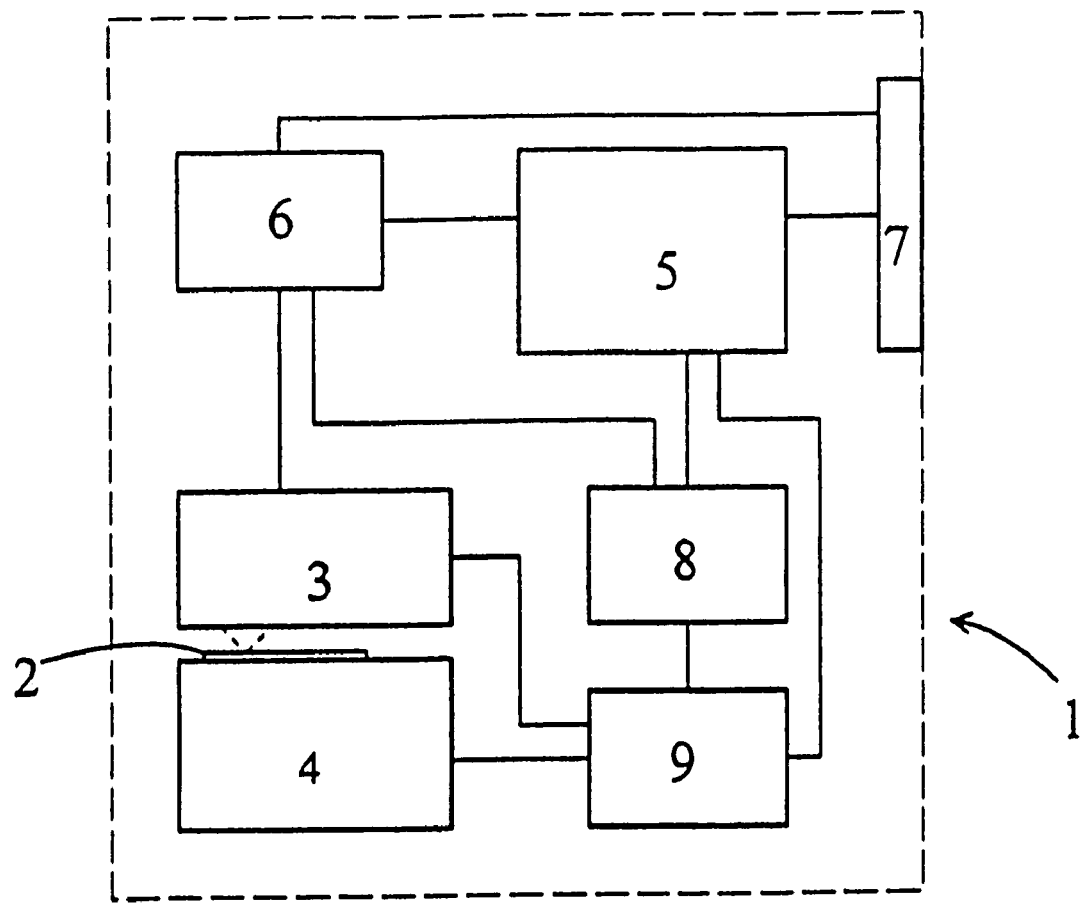
FIG. 1 shows a schematic diagram of the functional blocks of the optical storage system.

FIG. 1 shows the block diagram of the optical storage system 1 of the invention. The holographic optical storage system 1 comprises the optical recording medium. The medium is preferably an optical card 2, which is normally fixed on the card positioning unit 4. It must be emphasised that instead of the optical card, an optical disk or tape is also suitable to realise the invention. The optical card 2 is read and written (recorded) by the card read/write optics 3. The functions of the optical storage system 1 are controlled by the main controller 5, which is practically a microprocessor. The main controller 5 is controlling the data processor 6 and the synchronising circuit 8, and further the positioning controller 9. The main controller 5 is also connected to the interface 7. Data input and output are effected through the interface 7, and the data are processed by the data processor 6. Synchronising circuit 8 synchronises the read/write functions of the read/write optics 3 with the positioning functions of the positioning controller 9.

Figure 2:
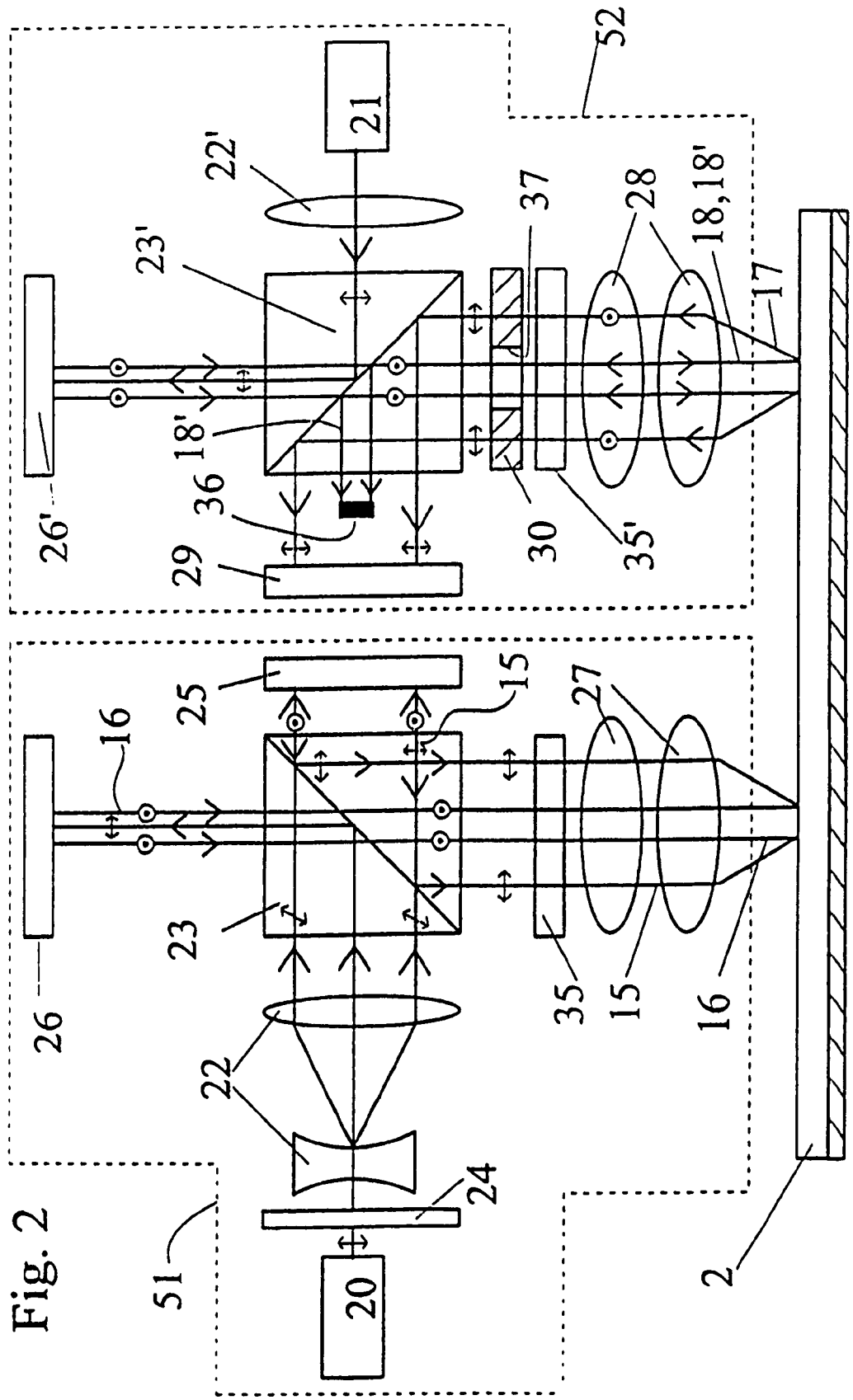
FIG. 2 shows a schematic diagram of the holographic read/write optics of the system and apparatus according to a preferred embodiment of the invention.

FIG. 2 illustrates the optical system of the holographic read/write optics 3 of FIG. 1. In the embodiment of FIG. 2, the holographic read/write optics 3 has a write optics part 51 and a read optics part 52. These two parts may be fully separated, having a separate moving system, but in a practical embodiment the two parts are moved together with a common positioning system. In another preferred embodiment, the write optics part 51 and a read optics part 52 are fixed, and the optical card 2 is positioned relative to the optics by the positioning mechanism 4 of FIG. 1 (see also FIG. 7.).

The write optics part 51 comprises the write laser 20, operating in the visible blue-green region, around 532 nm. The write laser 20 is preferably a semiconductor laser, but other types of laser are also suitable. However, the laser used for the recording must have a sufficient coherence length, i.e. longer than the path difference between the object beam and the reference beam. The beam of the write laser 20 is directed through the half-wave-plate 24, the beam shaping optics 22 and the beamsplitter 23. The beam-shaping optics 22 transforms the Gaussian intensity distribution of the laser 20 into a square distribution in a known manner. The purpose of this transformation is to provide uniform illumination in the whole object space, i.e. on the object SLM (Spatial Light Modulator) 25. The polarising beamsplitter 23 separates the beam into the object beam 15 and the reference beam 16. After the polarising beamsplitter 23 the object beam 15 is transversely polarised, and the reference beam 16 is parallel polarised, relative to the plane of FIG. 2. The reference beam 16 is sent towards the reference SLM 26. The reference beam 16 is reflected from the reference SLM 26, and thereby the polarisation will change to transverse polarisation. The reference beam 16 is further directed through the beamsplitter 23, another quarter wave-plate 35 and then falls on the surface of the optical card 2 through the objective lens 27, which will be described below. After passing through the quarter wave-plate 35, the linear polarisation of the reference beam 16 will change to a circular polarisation.

After leaving the beamsplitter 23 the object beam 15 falls on the object SLM 25, with transverse polarisation. From the object SLM 25 the object beam 15 is deflected back towards the optical card 2, through the beam splitter 23, and the quarter wave-plate 35. Due to the reflection on the object SLM 25, the object beam 15 will be parallel polarised when entering and leaving the beam splitter 23 for the second time. Again, the orthogonal linear polarisation of the object beam is transformed into an orthogonal circular polarisation after the quarter wave-plate 35, but the rotation direction of the object beam 15 is opposite to the rotation direction of the reference beam 16. Finally, the object beam 15 falls on the surface of the optical card 2 through the same objective lens system 27, with other words, the reference beam 16 and the object beam 15 has a common optical axis to and from the optical card 2. This configuration of the optical system is denoted as an on-axis configuration. The object beam 15 and the reference beam 16 are modulated by their respective spatial light modulators 25 and 26, as will be described below. The SLMs 26 and 25 are preferably LCD devices, with 1024×1024 or 512×512 pixel segments, where the light reflecting properties of the individual segments may be controlled individually by a suitable circuit, in the invention the data processing circuit 6. The object SLM 25 is encoded with the data, while the reference SLM 26 is encoded with the phase address. With this embodiment, the object SLM 25 is a device that modulates the amplitude (intensity) of the transmitted light, but other types of SLM devices are also contemplated for use in the apparatus of the invention. E.g. matrix polarisation modulators are also applicable, where the polarisation angle may be controlled. As will be discussed below, the reference SLM 26 is a polarising SLM which is capable of adding a $\pi$ phase delay to the reference beam 16. The object beam 15 and the reference beam 16 are imaged on the optical card 2 by a suitable objective lens system, preferably by Fourier transform lenses, here symbolised with the lens system 27. It is understood that other, presently not discussed optical components, like lenses, diaphragms, mirrors, etc. may also be used, in order to get a suitable beam shape at the SLM 26 and 25 and on the surface of the optical card 2. Particularly, a known focus and tracking servo optics and mechanism is also foreseen to focus the object beam 15 and the reference beam 16 on defined locations of the surface of the optical card 2.

With the embodiment of the read/write optics 3 shown in FIG. 2, the detection of the holograms on the optical card 2 is done with the read optics part 52. The read optics part 52 is similarly configured to the write optics 51, but the read laser 21 is a red laser. The read laser in this embodiment operates in the visible red region, between 600-700 nm, and is preferably another semiconductor laser or LED, or a He-Ne laser. Accordingly, the wave plate 35' is tuned for the wavelength of the read laser. Instead of the object SLM 25, there is a CCD detector 29. The hologram is imaged on the CCD detector 29 with suitable imaging optics, preferably Fourier transform lenses, here illustrated with the objective lens 28. The CCD detector 29 reads out the data stored in the hologram, which contains the bitmap image of the object SLM 25.

The recorded is in the form of data pages stored as thin Fourier holograms. This means that the holograms may not be treated as traditional volume holograms. However, the holograms are enough thick, so their thickness can not be neglected either. These holograms in accordance with the invention represent an intermediate case, where the diffraction pattern is between the so-called Bragg diffraction valid for thick gratings, and the diffraction valid for infinitely thin gratings. The layer thickness used in the invention is practically between 300 nm and 3000 nm, which means that the resulting diffraction pattern is that of a finite layer thickness, with an appreciable wavelength and angle selectivity, but that these do not reach the selectivity of thick holograms.

Figure 4A:
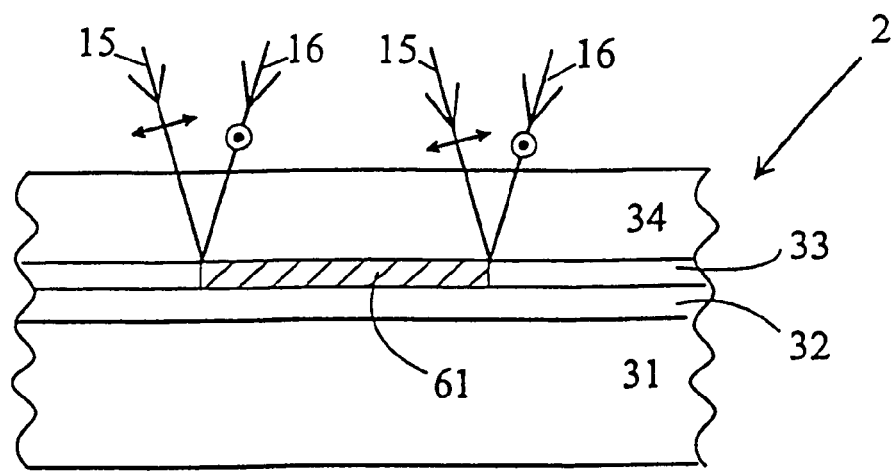
FIGS. 4a-b shows a schematic cross-section of the optical recording medium, in this case an optical card, utilised in the optical system of the invention, and illustrates the principle of the holographic recording method in accordance of the invention.
Figure 4B:
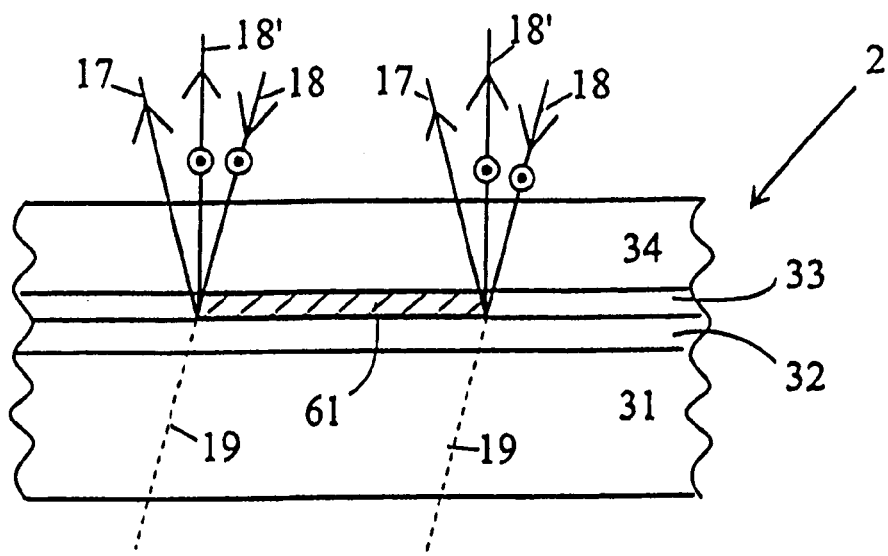

According to the invention, the holographic recording is made by reflected transmission holography, The principle of this holographic recording method is explained with reference to FIGS. 4a-4b. FIGS. 4a-b shows the cross-section of the optical card 2 and the reflective layer 32 underneath the recording layer 33. The recording layer 33 is relatively thin, and the reflective layer 32 is a wavelength selective layer, which reflects light on the readout wavelength, but absorbs (or alternatively transmits) light on the write wavelength. During recording (see FIG. 4a), the hologram 61 is created in the recording layer 33 of the card 2 by the polarisation interference pattern between the reference beam 16 and the object beam 15. In FIGS. 4a-b the incident and reflected beams 18,18' are shown at an angle to each other for the better illustration of the reading process, but it must be pointed out that in reality the incident and reflected reference beams are substantially parallel, and have a common optical axis, at least in the preferred embodiments shown in the description. On the contrary, the object beams 15, 17 and the reference beams 18,18' are indeed at a small angle to each other, although they still have a common axis.

During readout (see FIG. 4b), the incident reference beam 18 generates an object beam, which reproduces the information content of the original write object beam 15. The reproduced object beam would normally exit from the hologram 61 as transmitted object beam 19. But this transmitted object beam 19 is reflected on the reflective layer 32, propagates through the recording layer 33 one more time, and exists from the recording layer 33 as the reflected object beam 17. Of course, the reference beam 18 is also reflected as reflected reference beam 18', but this latter may be separated from the reflected object beam 17, using the polarisation properties and the different diffraction of the beams, as will be shown below.

As explained above, in the reflected transmission holography process in accordance with the invention, the readout of the hologram is performed in the transmission mode, but the transmitted object wave is reflected from the reflective layer, propagates through the recording medium, and is detected on the same side from which the reference wave arrives.

The holographic recording process utilised in the invention is the so-called polarisation holography. Polarisation holographic recording is accomplished by two plane waves having mutually orthogonal polarisation. In this type of recording the resulting light field is not modulated by intensity but only by polarisation. The induced optical anisotropy (dichroism or birefringence) is spatially modulated in accordance with the polarisation modulation of the recording light field, i.e., a polarisation holographic grating is recorded. The various possibilities for recording polarisation holographic gratings are known. It has also been shown that the diffraction efficiency (η) depends on the type of polarisation interference pattern, which forms the basis of the polarisation multiplexing. This is based on the fact that at sufficiently large values of photoinduced anisotropy it is feasible to record polarisation gratings with high efficiency, up to 25% for amplitude modulation and up to 100% for phase modulation. When the recordings is accomplished with two orthogonal circularly polarised waves, η is strongly dependent on the ellipticity of the reconstructing wave. By varying the ellipticity, η can vary from 0 to its maximum value. If the object and reference waves have parallel polarisations an ordinary intensity interference pattern results, i.e., the light field intensity is sinusoidally modulated. When the two waves have mutually orthogonal polarisations, the intensity of the resultant light field is constant and only its polarisation is periodically spatially modulated in accordance with the change of the phase shift between them producing a polarisation interference pattern. Both interference effects may be recorded with suitable materials. In the embodiments of the apparatus shown in FIGS. 2 and 3, it is contemplated to utilise both effects. In the preferred version the object SLM 25 provides intensity modulation, but the reference beam 16 and the object beam 15 are also orthogonally polarised, to improve the readout SNR.

During the holographic recording in a photoanisotropic material the polarisation interference pattern is recorded as a spatially modulated optical anisotropy. In the preferred realisation of the method of the invention, a so-called Side Chain Azobenzene Polyester (SCP) is used. In the recording process the molecules of the recording medium, e.g. a SCP compound, are aligned according to the polarisation of the incident light beam. The writing process utilises blue or green light, and the readout of the hologram is effected with red light. The recording process in e.g. azobenzene SCP material is described in detail in the publication "Side-chain Liquid Crystalline Polyesters for Optical Information Storage", in: Polymers for Advanced Technologies, Vol. 7. pp. 768-776., which is herewith included by reference. Similar materials suitable for holographic recording are also known, and may be used advantageously. The principles of polarisation holography are described in the publication "Polarisation holography. 1: A new high-efficiency organic material with reversible photoinduced birefringence". Appl. Opt. Vol. 23, No. 23, 1 Dec. 1984, pp. 4309-4312, and the publication "Polarisation holography. 2. Polarisation holographic gratings in photoanisotropic materials with an without intrinsic birefringence", Appl. Opt., Vol. 23, No. 24, 15 Dec. 1984, pp. 4588-4591. These latter are also include by reference. An important feature of the polarisation holography is that if the reference beam 16 and the reflected object beam 15 are chosen to be orthogonally polarised, then they may be completely separated by a polarising element. This results in outstanding signal-to-noise ratio (SNR). As shown in FIG. 2, the originally elliptic polarised beam of the write laser 20 and the read laser 21 are transformed into a parallelly polarised object beam 15 and a transversally polarised reference beam 16 (the plane of reference is the plane of FIG. 2.) by the wave-plate 35, and the polarising beam splitter 23. Upon readout, the reflected object beam 17 is separated from the reflected reference beam 18' with the help of polarising means and spatial filtering means. The polarising means and the spatial filtering means in this case include a half-wave plate 30 and a beam stop 36. The reflected object beam 17 is transversely polarised after passing through the half-wave plate 30. The central part of the half-wave plate 30 is provided with an aperture 37 for the reference beam 18. Before the detector 29 there is a centrally positioned beam stop 36, to filter out the reflected reference beam 18' which passes through the aperture 37 and partly reflects from the beam splitter 23' towards the detector 29. The beam stop 36 also filters out the reference beam 18 coming directly from the read laser 21. However, due to the difference in the write and read wavelengths, the reflected object beam 17 will diffract from the hologram on the holographic card 2 at a small angle to the reflected reference beam 18'. This small difference in the diffraction allow the spatial filtering of the reflected object beam 17 from the reflected reference beam 18'. As will be shown below, the objective lens 28 will keep the reflected object beam 17 spatially separated from the reflected reference beam 18', but at the same time it will image the reflected object beam 17 onto the peripheral parts of the detector 29, providing image correction on the object beam 17.

It must be noted that the diffraction efficiency also increases, if the polarisation technique is used together with the reflected transmission recording method. This is due to the fact that the polarised reference beam will phase shift with π on the interface layer of a reflective layer 32. That would mean that the with a circularly polarised beam the direction of rotation will change to the opposite, but at the same time the propagating direction of the beam also reverses. The result will be that the beam will diffract in the same directions when travelling back through the recording layer.

Returning to FIG. 2, the read objective lens 28 is designed to correct the distortion of the readout. This distortion results from the wavelength difference between the laser 20 and the laser 21. Because of the on-axis configuration of the optical system, the distortions will be axially symmetric, and therefore they may be corrected by an appropriately designed aspheric lens, acting as the objective lens 28. This distortion is less significant for central rays and more significant for the rays close to the edge of the image space. Since the central rays in the readout optics 52 are reserved for the reference beam 18, the peripheral parts of the objective lens 28 need to be tuned to the object beam 17 only.

FIGS. 4a-b are a schematic cross-sections of the optical recording medium. Here the recording medium is an optical card 2 used in the optical storage system 1 of the invention. The optical card 2 has a relatively thick—0,5-1 mm—plastic base plate 31, made of a suitable plastic material, e.g. polycarbonate or PVC. A wavelength selective reflective layer 32 with an approximate thickness of 100 nm is coated on the base plate 31 with vacuum evaporation, sputtering or other suitable process. The purpose of the reflective layer 32 is to reflect during readout the object beam transversing the recording layer 33. Therefore, the reflective layer 32 must be reflecting the readout wavelength, but should advantageously be non-reflecting on the write wavelength. It is desirable to suppress reflection of the writing beams, so that no disturbing interference results from the reflection of the reference beam 16 and the object beam 15 during writing. The recording layer 33 above the reflecting layer 32 is protected from mechanical and chemical effects by a protective layer 34.

Figure 5:
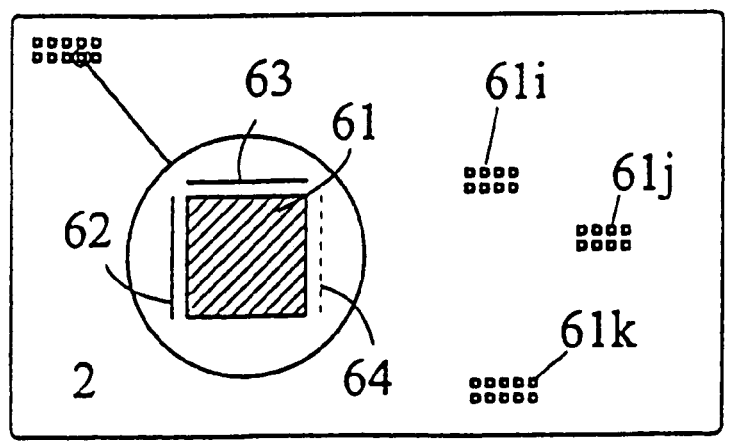
FIG. 5 shows the layout of the data on the optical card of the invention, and illustrates the method used for encoding of the information.

FIG. 5 is a top view of the optical card 2, seen from the recording side, i.e. from the side of the protective layer 34. Though there is nothing in the way for providing a storage surface on both sides of the optical card, in practice only one side is used for data recording, while the other side is provided with written information legible with the naked eye, i.e. a short informative text about the type of the optical card. The recording on the optical card 2 is made in the form of very small holograms 61, each with a square form and the size of approx. 0.8×0.8 mm². In FIG. 5 several other holograms 61i, 61j, 61k are shown, which all have the same structure as hologram 61. The holograms 61 are spaced approx. 200 microns apart from each other, and between them there is provided positioning markers 62 and 63, and eventually identifying markers 64. One set of markers 62 is used for positioning in the X direction, while the other set of markers 63 are used to align the read/write optics in the Y direction. The identifying markers 64 may contain information about the position of the hologram 62 on the optical card 2, and may also contain information about the type of the hologram 62.

Figure 3:
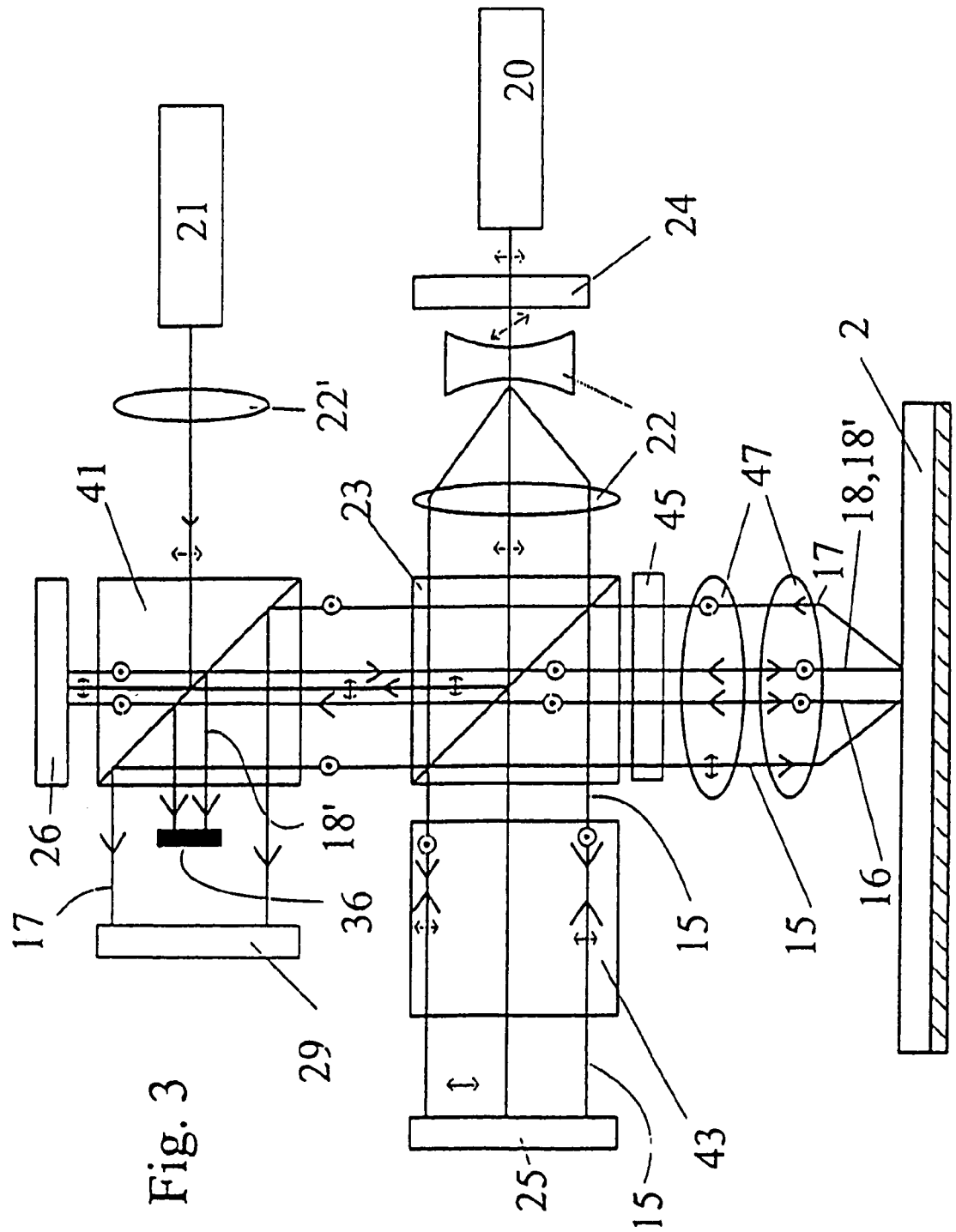
FIG. 3 shows a schematic diagram of the holographic read/write optics of the system and apparatus according to another preferred embodiment of the invention.

FIG. 3 shows a modified version of the write/read optics of the invention presented on FIG. 2. This optical system combines the write optics part 51 and the read optics part 52 into a common unit. The basic configuration contains all the elements of the write optics 51, and the optical path of the write object beam and the write reference beam is principally the same. Accordingly, the combined read/write optics of FIG. 3 comprises the write laser 20, operating in the visible blue-green region, around 532 nm. The read laser operates in the visible red region, approximately at 630 nm, and is preferably another semiconductor laser or LED, or a He-Ne laser. The beam of the write laser 20 is directed through the half-wave-plate 24, the beam shaping optics 22 and the beamsplitter 23. The light of the read laser 21 is inserted into the optical system through the neutral beam splitter 41. The beam-shaping optics 22 and 22' transform the Gaussian intensity distribution of the laser 20 and 21 into a square distribution. During writing, the beamsplitter 23 separates the beam into the object beam 15 and the reference beam 16. The reference beam 16 is sent through the beam splitter 41 towards the reference SLM 26. The reference beam 16 is reflected from the reference SLM 26 back through the beam splitter 41, the beamsplitter 23, a quarter wave-plate 45 and falls on the surface of the optical card 2 through the objective lens system 47, which will be described below. It is necessary to compensate the delay caused by insertion of the neutral beamsplitter 41 in the optical path of the reference beam 16. Therefore, an additional element must be added in the combined read/write optics 3. This is the compensator block 43, which provides the necessary delay in the optical path of the object beam 15. It must be noted that the quarter wave-plate 45 of the embodiment of FIG. 3 may be electronically controlled, so that it can be adjusted to the wavelength of the write or read beam. Alternatively, the quarter wave-plate 45 may be tuned to the wavelength of the read laser or the write laser, and the noise resulting from the difference of the wavelengths may be ignored or suppressed by appropriate means.

After the beamsplitter 23 the object beam 15 falls on the object SLM 25 through the compensator block 43. From the object SLM 25 the object beam 15 is reflected back towards the optical card 2, through the compensator block 43, the beamsplitter 23, and the quarter wave-plate 45. The object beam 15 falls on the surface of the optical card 2 through the same objective lens 47, so that the reference beam 16 and the object beam 15 have a common optical axis to and from the optical card 2. Hence, the combined read/write optics 3 is also built up with an on-axis configuration. The object beam 15 and the reference beam 16 are modulated by their respective spatial light modulators 26 and 25, similarly to the case with the separate read and write optics parts 52 and 51. The object beam 15 and the reference beam 16 are imaged on the optical card 2 by an objective lens system 47. Other optical components, like lenses, diaphragms, mirrors, etc. may also be used, in order to get a suitable beam shape at the SLM 26 and 25 and on the surface of the optical card 2. The functioning of the objective lens system 47 is described in detail with reference to FIGS. 6a-b.

Returning to FIG. 3, readout of the holograms is made with the read laser 21. The beam of the read laser 21 is coupled into the optics through the neutral beam splitter 41, and reflected toward the reference SLM 26. From the reference SLM 26 the reference beam 18 is reflected towards the optical card through the neutral beam splitter 41, the polarising beam splitter 23, the quarter wave-plate 45 and the same objective lens 47 which is also used for writing.

The incident reference beam 18 will diffract on the hologram on the optical card 2, and the reflected object beam 17 will be generated. Detection of the holograms on the optical card 2 is done with the CCD detector 29. The reflected object beam 17 is reflected towards the CCD detector 29 by the neutral beam splitter 41. During readout the electronically controllable wave plate 45 is tuned to the wavelength of the read laser 21. As with the optical system shown in FIG. 2, the reflected object beam 17 is separated from the reflected reference beam, but in this case only with spatial filtering. The spatial filtering is accomplished by the beam stop 36 positioned before the central area of the detector 29.

Figure 6A:
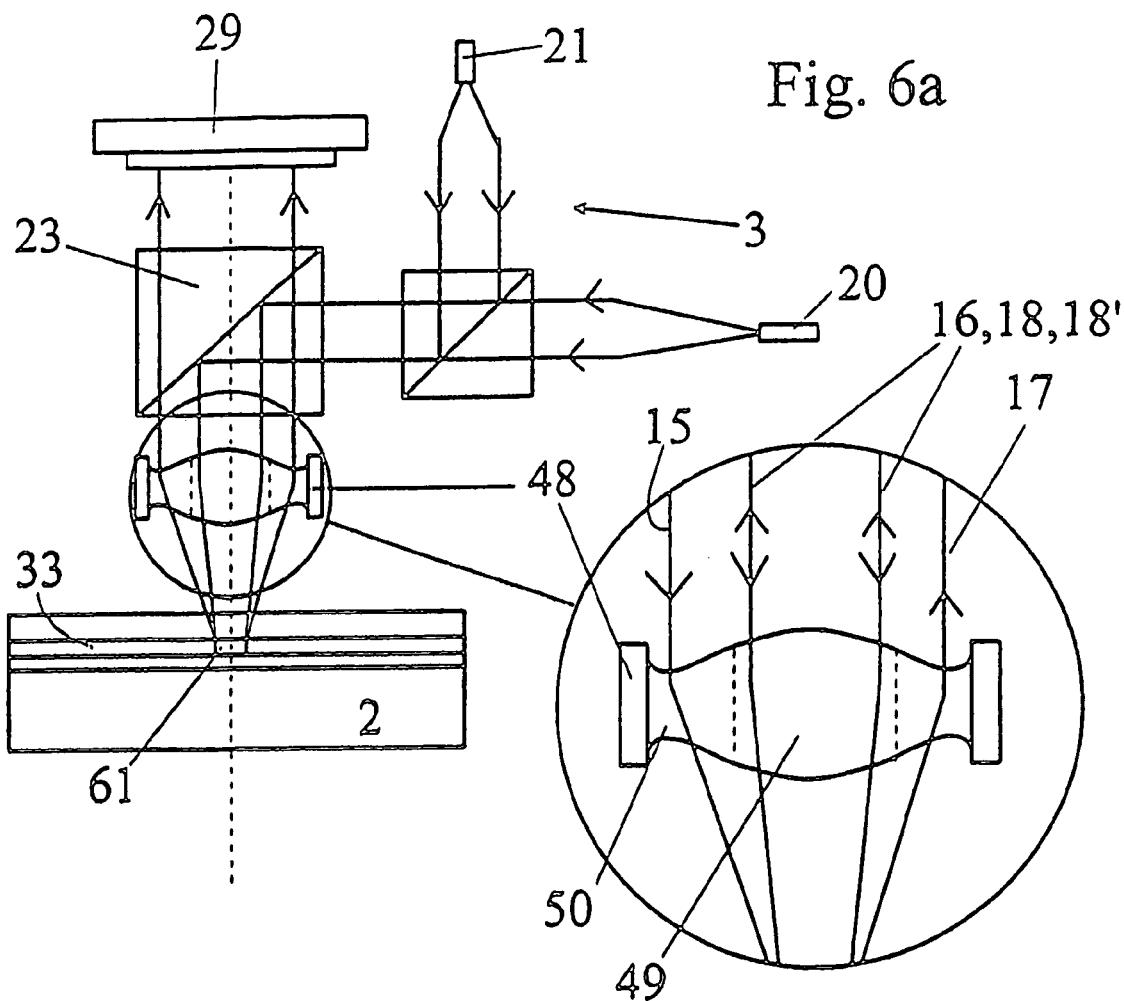
FIGS. 6a-b shows the side and top view of the means for the correction of the wavelength distortion in the read/write optics of FIG. 3.
Figure 6B:
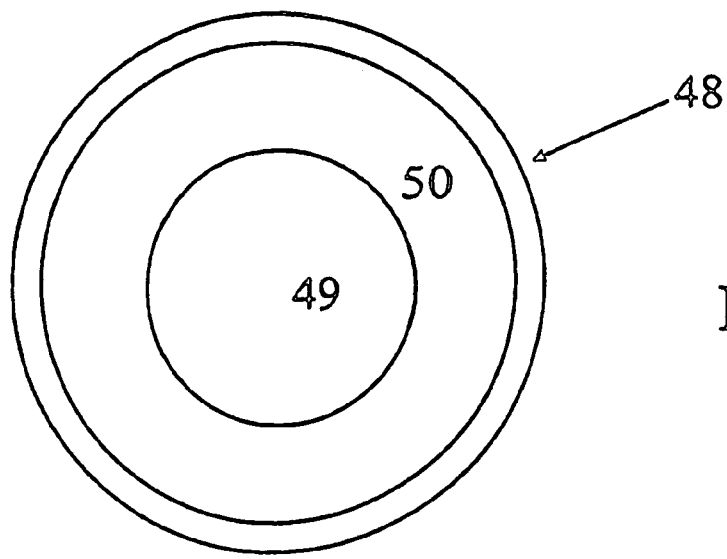

Referring to FIGS. 6a-b, the principle of the wavelength distortion correction means according to a preferred embodiment is shown. In the embodiment of FIGS. 2 and 3, the wavelength distortion correction means are embodied by the objective lens system 28 and the objective lens system 47. The function of the objective lens systems 28 and 47 is explained with reference to FIG. 6a, with the help of a simplified scheme of the optical setup similar to that in FIG. 3. The objective lens system 47 of FIG. 3 consists of one or more aspherical plastic lenses, or aspherical glass lenses. At least one aspheric lens 48 comprises a central region 49 and an annular region 50 in its useful aperture. The aperture with the central region 49 and the annular region 50 is shown in FIG. 6b. As shown in FIG. 6a, during recording, the useful cross-section of the object beam 15 passes through the annular region 50, while the reference beam 16 passes through the central region 49 only. During readout, the read reference beam 18 will be confined to the central region 49, but the reflected transmission beam, i.e. the reflected object beam 17 will diffract in greater angle, because its wavelength is longer. Therefore, a small fraction of the reflected object beam 17 will pass through the central region 49 and the remaining larger fraction will pass through the annular region 50. Accordingly, the annular region 50 is shaped so as to compensate the wavelength distortion of the reflected object beam 17, and to provide a distortion-free image of the hologram 61 on the CCD detector 29. The shape of the central region 49 is formed so as to provide an acceptable imaging for the reference beams 16 and 18, both on the reading and the writing wavelengths. Of course, this will be a compromise between the optimal lens shapes for ideal imaging, so both beams will remain distorted to a small extent. But this distortion is tolerable, because in the central region 49 the angles of incidence are smaller than in the annular region 50.

It must be noted that the reference SLM 26 may be substituted with a mirror as well, both in the combined optics 3 of FIG. 3 and in the separate read and write optics parts 52 and 51 of FIG. 2. The purpose of the reference SLMs 26 is to allow the possibility of the so-called multiplexing using deterministic phase encoding. This method is described in the publication "Volume hologram multiplexing using a deterministic phase encoding method", Opt. Common. 85 (1991), pp. 171-176. In this multiplexing method a liquid crystal spatial light modulator (LCSLM), in our case the reference SLM 26 is placed in the way of the reference beam. Each pixel of the reference SLM 26 may be switched into two positions: either it adds $\pi$ to the phase of the incoming beam, or it leaves the phase unchanged. In this way different reference wavefronts can be produced. The set of adjustable phases for a given reference beam represents the address of the corresponding object. It may be shown that during the reconstruction process a given reference beam will only reconstruct its own corresponding object beam, but the detected signal intensity will be lower. The number of independently recordable subholograms within one physical hologram is equal to the number of different phase addresses. Of course, because of the decrease in the signal intensity, the SNR of the recorded subholograms will decreases as well, so there is a practical limit to the multiplexing. It must be noted that the conditions for multiplexing are better for thicker holograms, but with thicker holograms the difference of the read and write wavelengths will cause larger distortions at the edges of the object space.

It has turned out that phase-code multiplexing technique works well for thin holograms. The number of multiplexed holograms can be increased by increasing the pixel number of the LCSLM. In order to minimize crosstalk, the different phase codes must be investigated, and those with the least crosstalk may be selected for practical purposes. The main factor that restricts the maximum number of multiplexed subholograms is the diffraction limited spot size of an LCSLM pixel. The number of the practically achievable multiplexed subholograms is approximately 5 to 30.

Beside the above described phase encoding, the so-called polarisation multiplexing technique may be used as well, if the optical setup is not with an on-axis configuration, but the reference and object beams are at an angle to each other. It is known that for the case of recording with two orthogonal circularly polarised waves, the diffraction efficiency is strongly dependent on the polarisation of the reconstructing wave, particularly on its ellipticity. It is possible to control the readout wave ellipticity with a $\lambda/4$ plate. The maximum value of the diffraction efficiency $\eta$ in the +1 order is reached when the polarisation of the reconstructing wave coincides with that of the reference wave during the recording and falls to zero at orthogonal polarisation. At the same time the change of $\eta$ in the -1 order is described by a similar relation, shifted at 90°; when $\eta$ is at its maximum in the +1 order, in the -1 order it is equal to zero and vice versa. Therefore, the polarisation multiplexing method is the following:

Take the first exposure with left-hand circular polarisation reference beam ('A' hologram)

Take the second exposure with right-hand circular polarisation reference beam ('B' hologram)

If we use left-hand circular polarisation read-out beam then the diffraction efficiency of the 'A' hologram will be maximum and the diffraction efficiency of the 'B' hologram will be minimum and we will reconstruct the 'A' hologram while the overlapping of the 'B' hologram will be minimum.

If we use right-hand circular polarisation read-out beam then we will reconstruct the 'B' hologram while the overlapping of the 'A' hologram will be minimum.

Accordingly, the sensitivity of $\eta$ to the polarisation of the recording beam makes it possible to double the information capacity of the recording. It is straightforward that in the optical recording method of the invention, the polarisation multiplexing could be combined with deterministic phase encoding multiplexing. The appropriate phase encoding of the SLM 26 is controlled by the data processor 6.

In a practical system using the information storage method of the invention a five to thirtyfold phase multiplexing is contemplated. Polarisation multiplexing necessitates additional optical or mechanical elements to rotate the polarisation planes of the object and reference beams, and the polarising elements.

Such a system is also feasible, though the involved number of the mechanical and optical elements would make the system more complicated than the demonstrated preferred embodiments. In theory wavelength multiplexing is also possible, but the SCP materials inherent sensitivity to the write and read wavelengths makes this solution impractical.

A further possibility is the use of rotational multiplexing, i.e. coupling several object SLM areas successively to the optical system, as if the object SLM-s were rotated around the axis defined by the reference beam and the hologram on the optical card. True mechanical rotation or displacement of the object SLM-s is also possible.

FIG. 7 is a schematic diagram of a possible mechanical construction of the optical system 1 of the invention. The optical system 1 has two main mechanical components, the read/write optics 3 and the card positioning mechanism 4. The read/write optics 3 comprises the holographic read/record optics and the fine servo. The card positioning mechanism comprises the X-directional translating chassis 55, moved by the X-motor 58, preferably a stepper motor. The chassis 55 is gliding on rails relative to the base 56. Within the chassis 55 there is arranged an Y directional translating chassis 59, actuated by the Y-motor 57. It is understood that other solutions are equally well suited to provide for the positioning of the optical card 2 relative to the read/write optics 3. For example, translation mechanisms may be provided to move the read/write optics 3, while the optical card 2 remains fixed, and the card positioning mechanism only performs the stable fixing of the optical card 2, which is inserted into the card reader device by an external user, and after the reading and/or writing the card positioning mechanism ejects the optical card.

Figure 8:
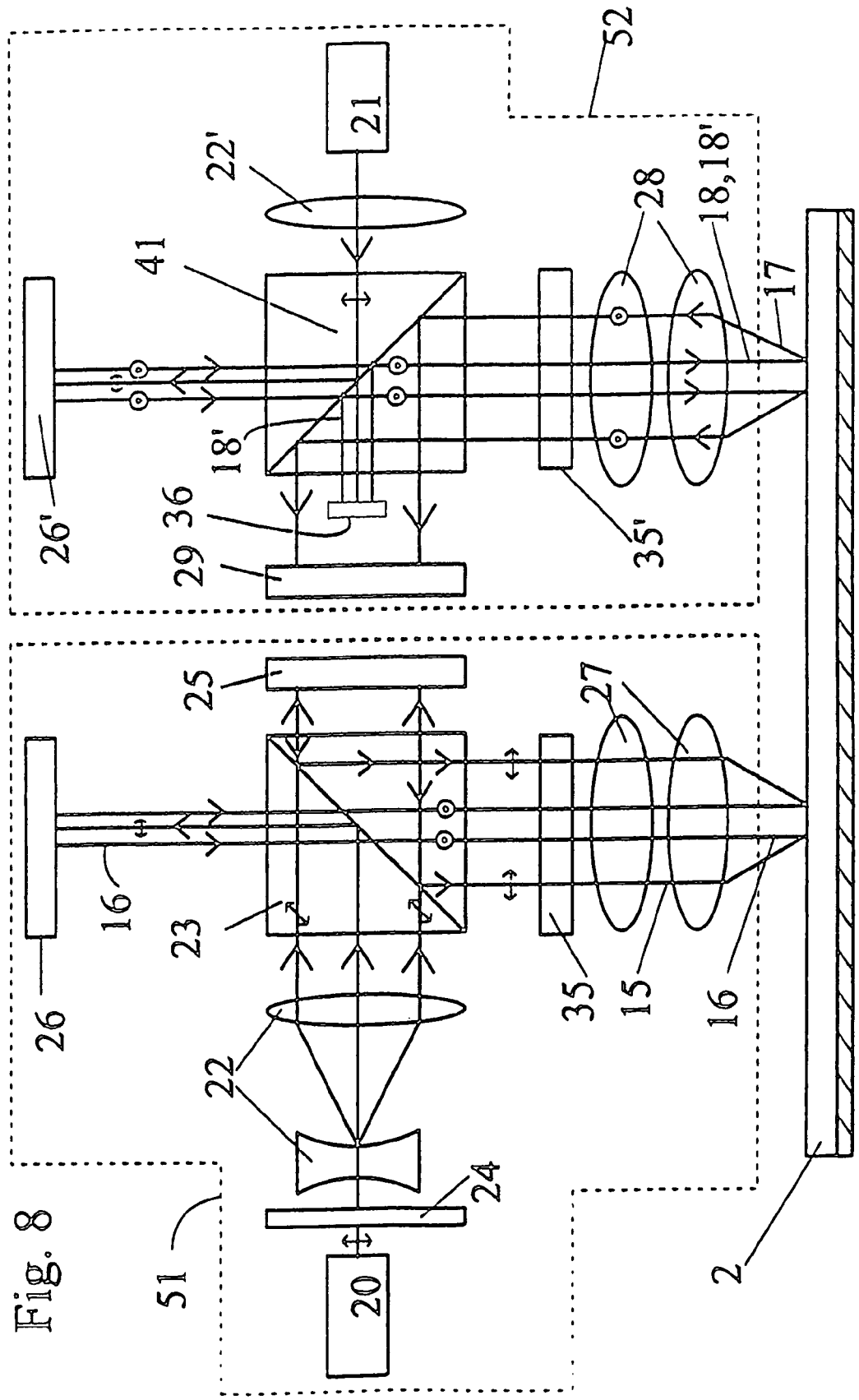
FIG. 8 is a schematic diagram of the holographic read/write optics of the system and apparatus according to a modified embodiment of the invention.

Finally, FIG. 8 illustrates a further embodiment of the optical system used in the apparatus according to the invention. The optical setup of FIG. 8 is similar to that presented in FIG. 2, i.e. this is also an optical head with separated write optics part 51 and read optics part 52. The main difference compared with the setup shown in FIG. 2 is in the read optics part 52. Here, the polarising beam splitter 23' is replaced by a neutral beam splitter 41. The half-wave plate 30 of FIG. 2 is omitted, and the separation of the reflected reference beam 18' is made with spatial filtering only, i.e. by means of the beam stop 36, utilising the difference in the diffraction between the reflected object beam 17 and the reflected reference beam 18. This solution has the advantage that fewer polarising elements are needed, but at the same time there is less light intensity on the detector 29, which may lead to lower SNR.

The optical information storage system based on the principles outlined in the invention has very favourable parameters compared with the available optical cards. With a 256×256 bitmap image pixel resolution and a 1024×1024 real image pixel resolution imaged onto approx. 0.8 mm×0.8 mm holograms, with four-fold multiplexing, the data capacity of a credit-card sized optical card may well reach 100 Mbytes. Assuming the readout of four holograms in a second, which is not unrealistic, a data transfer rate of 100 kByte/s can be achieved.

It must be noted that the wavelength distortion correction means may be realised by other elements in the system. Especially, it is also foreseen to utilise a high resolution CCD detector 29, and to perform the distortion correction by a suitable software, which would analyse the image on the CCD detector 29. This task could be done by the data processor 6, but the use of a specially dedicated processor unit is also contemplated.

The data processor 6, or an other encoding unit may be used advantageously for the encoding of the recorded information on the holographic optical card 2. Holographic recording in inherently more secure compared to traditional magnetic or other types of optical cards. According to the invention, we propose to use the advantageous properties of the holographic recording for the implementation of a coding method, which will be explained with reference to FIG. 5.

As we have shown above, in a preferred mode of the recording method of the invention, the information is in the form of several discrete holograms or subholograms recorded in different physical and/or logical recording locations on the optical card. These different locations are symbolised by the holograms 61i, 61j, and 61k. The holograms contain data sets, where the sequence of the data sets together constitute the recorded information. E.g. to reproduce the information content of a specific file, the holograms should be read in the following order: 61j, 61k, 61i. This order or sequence of the location of the holograms is determined randomly, i.e. the data sets contained in the holograms are recorded in a random sequence of the recording locations. It must be noted that the term "random" may also mean pseudo-random ordering, or the ordering by a secret, pre-determined, and not obvious sequence.

Though in FIG. 5 a random sequence of the physical recording locations is shown, it must be stressed that the random locations may also mean random logical locations. In order to maintain high write and readout data rate, it is especially contemplated that the physical locations should be in a natural order during recording or reading, so that the quick mechanical re-positioning of either the card 2 or the read/write optics 3 from one recording location to another will not pose problems. In this latter case the randomization of the locations is made only in the logical locations, and the physical locations are ordered. If the information is recorded in multiplexed holograms, each multiplexing mode represents a multiplexing address. In this case the logical recording locations may be identified by the multiplexing address. In a proposed embodiment of the optical card 2 and the read/write optics 3, the information is recorded by polarisation holography using phase-code multiplexing.

Thereby one physical hologram volume contains several, maybe as much as thirty phase-coded multiplexed subholograms, each subholograms containing one data set. In this case the logical recording locations of the data sets within one hologram 61 are identified by the phase code address n, where n is an integer, typically in the range between 1-30. The identifier of the location of the n-th data set in the hologram 61i may be denoted as 61i/n.

The data are recorded and read in the following manner:

The first data set is recorded to the location with the identifier 61j/n. The identifier of this location is stored to the directory of the card 2, and encrypted, so that only authorised persons are allowed to read the identifier. Thereafter, the next data sets are recorded in the locations 61j+1/p, 61j+2/q, 61j+3/r, 61j+4/s, etc. The physical locations 61j, 61j+1, 61j+2, 61j+3, 61j+4 represent holograms following each other in the same row or column on the optical card 2.

The series n,p,q,r,s etc. represent a random sequence. It is also feasible if the physical hologram 61j remains the same, and only the logical locations 61j/n, 61j/p, 61j/q, 61j/r, 61j/s, etc. are recorded in a random sequence, until all subholograms 61j/1-61j/100 are recorded. The recording than continues in the next physical hologram 61j+1, or, alternatively, in the randomly selected physical hologram 61k.

The identifier of the location of the following data sets is stored in the previous data sets. In the example above, the identifier 61j+1/p is stored in the data set of the subhologram 61j/n, the identifier 61j+2/q is stored in the data set of the subhologram 61j+1/p, and so on.

It is also possible to store the random sequence of the locations of the data sets together, in a directory area of the optical card 2. In this case the whole sequence is encrypted and/or made inaccessible for unauthorised users. The access to the random sequence is allowed with e.g. a PIN code.

While the invention has been shown with reference to the specific embodiments of the attached drawings, other advantageous embodiments may be realised by those skilled in the art. Obviously, the hologram recording medium could be made in the form of an optical disk or tape, and the optical recording apparatus may be modified accordingly, with appropriate disk or tape positioning and rotating/winding mechanisms, instead of that used for the positioning of the optical card 2.

The invention claimed is:

1. Apparatus for the writing and reading of a holographic recording medium, preferably an optical card (2), in the form of two-dimensional bit-maps having a recording medium holding and/or positioning mechanism (4), movable or fixed read and write optics (9), the write optics comprising a polarised writing light source (20), polarising selector means (23) for separating and/or combining a reference beam and an object beam, object beam modulating means (25), polarisation wave plate (24,35), an objective lens (27,47) for imaging the object beam onto a recording layer, and further the read optics comprising a polarised reading light source (21), and a polarising selector (23') and/or spatial filtering means for separating and/or combining the reference beam and an image beam, a light detector (29) and an objective lens (28,47) for imaging the image beam onto the light detector (29), characterised in that the wavelength of the reading light source (21) is different from the writing light source (20), recording data in a multiple recording layer, of the thickness of 250-1000 nm;

the writing source (20) is of the kind of polarization holography;

the read optics comprise wavelength distortion correcting means for correcting the distortion of the reconstructed image caused by the difference in the wavelength of the reading and writing light wherein the wavelength distortion correcting means of the read optics comprise an aspherical plastic objective lens (48).

2. Apparatus according to claim 1, wherein the read optics and the write optics have a common objective lens (47) for imaging the reference and object beams (18,16) overlapping each other to make a hologram having orthogonal polarizations onto a recording layer and for imaging the reflected object beams (17) onto the read detector (29), and wherein the common objective lens is an aspheric lens (48) for the correction of the wavelength distortion, the aspheric lens (48) having a central region (49) and an annular region (50) in its aperture, where the central region (49) of the aspheric lens is tuned to the wavelength of the writing light source (20) for focusing the write object beam (17) onto the recording layer (33), and at the same time tuned to the wavelength of the read light source (21) for imaging the read object beam (17) onto the detector (29), and further the annular region (50) of the lens (48) is tuned to the wavelength of the read light source (21) for imaging the reflected object beam (17) onto the detector.

* * * * *